United States Patent [19]

Igi et al.

[11] Patent Number: 4,833,217

[45] Date of Patent: May 23, 1989

[54] POLYCARBONATE RESIN COMPOSITION

[75] Inventors: Keishiro Igi, Kurashiki; Takayuki Okamura, Okayama; Shunro Taniguchi, Kurashiki; Masao Ishii, Kurashiki; Yoshifumi Murata, Kurashiki; Shinichi Yokota, Kurashiki; Takeshi Matsumoto, Chiba; Hideki Endo; Kazuto Hashimoto, both of Ichihara, all of Japan

[73] Assignees: Kuraray Co., Ltd., Okayama; Idemitsu Petrochemical Co., Tokyo, both of Japan

[21] Appl. No.: 805,659

[22] Filed: Dec. 6, 1985

[30] Foreign Application Priority Data

Dec. 14, 1984 [JP] Japan ................................ 59-264994
Dec. 14, 1984 [JP] Japan ................................ 59-264995

[51] Int. Cl.⁴ .............................................. C08L 81/00
[52] U.S. Cl. ................................... 525/439; 525/466
[58] Field of Search .................................. 525/439, 466

[56] References Cited

U.S. PATENT DOCUMENTS

| | | | |
|---|---|---|---|
| 3,998,908 | 12/1976 | Buxbaum | 524/710 |
| 4,126,592 | 11/1978 | Borman | 525/439 |
| 4,169,868 | 10/1979 | Schreckenberg | 525/439 |
| 4,252,922 | 2/1981 | Adelmann | 525/439 |
| 4,469,850 | 9/1984 | Belfoure | 525/439 |
| 4,598,129 | 7/1986 | Borman | 525/439 |

FOREIGN PATENT DOCUMENTS 2919629 11/1980 Fed. Rep. of Germany .

OTHER PUBLICATIONS

Patent Abstracts of Japan, vol. 5, No. 4, (C-38) [676], 1/13/81, of JP-A-55 131 048 and JP-A-55 133 445.

Primary Examiner—Patricia Short

[57] ABSTRACT

A polycarbonate resin composition which comprises
(i) bisphenol type aromatic polycarbonate, in admixture with
(ii) 5 to 200 parts by weight of a polyester type copolymer, per 100 parts by weight of said bisphenol type aromatic polycarbonate, which is produced by adding
 (a) 5 to 100 parts by weight of bisphenol type aromatic polycarbonate having a viscosity-average molecular weight of not less than 5,000,
 to (b) 100 parts by weight of a polyester precursor having a number-average polymerization degree of 1 to 30 which is obtained from bifunctional carboxylic acid mainly composed of terephthalic acid or a derivative thereof having an ester forming ability and a diol component, and effecting polycondensation, which provides an improved fluidity and solvent cracking resistance without remarkably decreasing of the original impact resistance and transparency of polycarbonate, to eliminate the defects of polycarbonate.

21 Claims, No Drawings

POLYCARBONATE RESIN COMPOSITION

FIELD OF THE INVENTION

The present invention relates to a polycarbonate resin composition which has improved moldability and solvent cracking resistance. The present invention also relates to a modifying agent for a polycarbonate resin used in the composition of the present invention.

BACKGROUND OF THE INVENTION

Bisphenol type aromatic polycarbonate (hereinafter, sometimes referred to as "polycarbonate") has been known as a resin for molding which has excellent physical and thermal properties. Such polycarbonate has, however, a high melting viscosity, and hence, molding temperature and molding pressure are higher than other resins, which induces a defect in molding. Further, a molding article of polycarbonate is not only inferior in hardness, but has a defect that it is easy to cause cracking by the concentration of stress in the presence of a certain solvent.

In order to improve these defects of polycarbonate which has a less moldability and less solvent cracking resistance without much damage of an original high impact resistance, transparency and heat resistance of polycarbonate, it has been proposed to incorporate various polyesters into a polycarbonate resin. For example, Japanese Patent Publication No. 37633/1979 discloses to incorporate polyalkylene terephthalate, which is obtained by copolymerization of an ethylene oxide adduct of bisphenol A as a diol component, into polycarbonate. Japanese Patent Laid Open Publication No. 94538/1978 discloses to incorporate polyalkylene terephthalate having a diol component of cyclohexane dimethanol into polycarbonate. Japanese Patent Laid Open Publication No. 145751/1980 discloses to incorporate polyestercarbonate into the composition to improve transparency.

However, the method described in the above Japanese Patent Publication No. 37633/1979 has a disadvantage in industry because it needs an expensive diol such as an ethylene oxide adduct of bisphenol A. The method described in the above Japanese Patent Laid Open Publication No. 94538/1978 brings insufficiently improved solvent cracking resistance because of polyalkylene terephthalate to be incorporated in amorphous polyester. The method described in the above Japanese Patent Laid Open Publication No. 145751/1980 can improve the transparency of a composition of polycarbonate and polyalkylene terephthalate by addition of said polyestercarbonate copolymer. However, when the polyestercarbonate disclosed in the reference is added into a single system of polycarbonate, it is not only difficult to maintain the transparency of polycarbonate itself, but it induces an insufficiently improved solvent cracking resistance.

OBJECT OF THE INVENTION

Accordingly, it is an object of the present invention to provide a useful polyester type copolymer as an inexpensive modifying agent for improving moldability and solvent cracking resistance, which are defects of polycarbonate, without much damage of the original excellent characteristics of polycarbonate (e.g. high impact resistance, heat resistance, transparency).

It is another object of the present invention to provide a process for production of a polyester type copolymer which is useful as a modifiying agent for improving of moldability and solvent cracking resistance.

It is further object of the present invention to provide an inexpensive polycarbonate composition which has improved moldability and solvent cracking resistance without much damage of the original excellent characteristics of polycarbonate.

SUMMARY OF THE INVENTION

The present inventors have intensively studied to perform the above objects. As the result, it has been found that a polyester type copolymer obtained by a specific polymerization method is effective as a modifiying agent for polycarbonate.

The desired improved polycarbonate resin composition of the present invention comprises (i) bisphenol type aromatic polycarbonate, in admixture with (ii) 5 to 200 parts by weight of a polyester type copolymer (i.e. copolyester), per 100 parts by weight of said bisphenol type aromatic polycarbonate, which is produced by adding (a) 5 to 100 parts by weight of bisphenol type aromatic polycarbonate having a viscosity-average molecular weight of not less than 5,000, to (b) 100 parts by weight of polyester precursor having a number-average polymerization degree of 1 to 30 which is obtained from bifunctional carboxylic acid mainly composed of terephthalic acid or a derivative thereof having an ester forming ability and a diol component, and effecting polycondensation.

Further, the present invention also provides, as an useful modifying agent for polycarbonate, polyester type copolymer which is produced by adding (a) bisphenol type aromatic polycarbonate having a viscosity-average molecular weight of not less than 5,000, to (b) a polyester precursor having a number-average polymerization degree of 1 to 30 which is obtained from bifunctional carboxylic acid mainly composed of terephthalic acid or a derivative thereof having an ester forming ability and a diol component, and effecting polycondensation.

The viscosity-average molecular weight M is, herein, obtained from intrinsic viscosity $[\eta]$ measured in dichloromethane at 20° C. through the following Schnell's equation:

$$[\eta] = 1.23 \times 10^{-5} M^{0.83}$$

The bisphenol type aromatic polycarbonate which is used as one component of the composition or as one component of the copolymer in the present invention is a polymer having a unit of the structure of the following general formula (II):

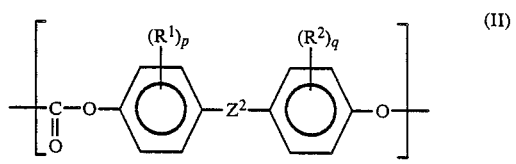

wherein $Z^2$ is a bond or $C_{1-8}$ alkylene, $C_{2-8}$ alkylidene, $C_{1-15}$ cycloalkylene, $C_{1-15}$ cycloalkylidene, $SO_2$, SO, O CO or

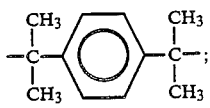

$R^1$ and $R^2$ are, respectively, chlorine or bromine atom, or a $C_{1-8}$ saturated alkyl group; and p and q are respectively integers of 0–4.

Suitable examples of the unit of the structure of the formula (II) are as follows:

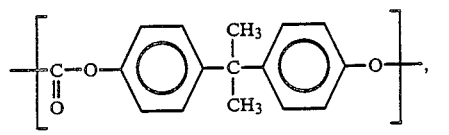

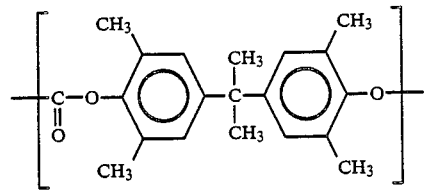

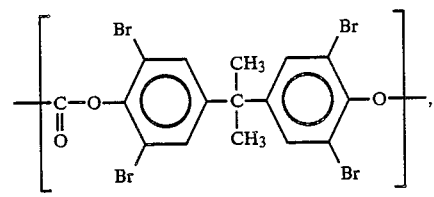

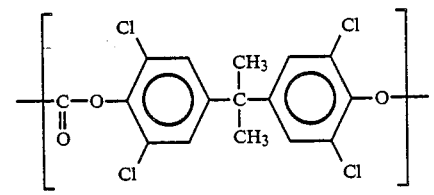

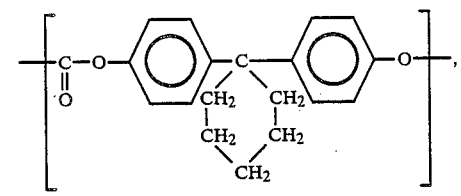

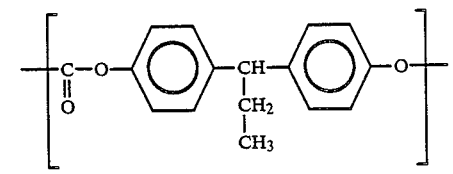

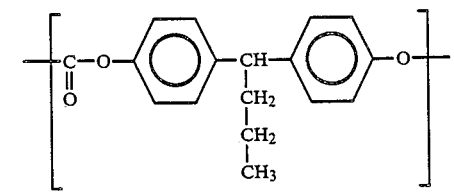

Such bisphenol type aromatic polycarbonate is known and can be easily obtained from an aromatic dihydroxy compound or the derivative thereof as main raw material by a conventional phosgene method or ester exchange reaction method.

The polyester precursor used in the present invention comprises the bifunctional carboxylic acid mainly composed of terephthalic acid or the derivative thereof having an ester forming ability (hereinafter, sometime expressed as a "dicarboxylic acid component") and a diol component, and is terephthalate type (poly) ester containing the unit of the following formula (I):

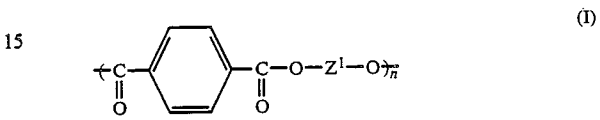

wherein $Z^1$ is the bifunctional residue which is produced by removing of hydroxyl groups from diol, preferably ethylene and tetramethylene, and n is 1 to 30.

When the polyester precursor comprising a dicarboxylic acid component other than terephthalic acid, for example, aliphatic carboxylic acid is used, a resultant copolymer induces an insufficient improved solvent cracking resistance of polycarbonate.

There may be incorporated with the dicarboxylic acid component other than the terephthalic acid component provided that it does not harm the effect of the present invention. Suitable examples of dicarboxylic acid are, for example, aliphatic dicarboxylic acids such as oxalic acid, malonic acid, adipic acid, suberic acid, azelaic acid, sebasic acid, decane dicarboxylic acid, and the like; aromatic dicarboxylic acids such as isophthalic acid, naphthalene dicarboxylic acid and the like; and the derivatives thereof having an ester forming ability. These dicarboxylic acids may be used alone or in combination of two or more kinds thereof. The dicarboxylic acid component other than terephthalic acid is generally incorporated in an amount of up to 20 molar %, per whole dicarboxylic acid.

The diol component is not specifically restricted. Suitable examples of the diol component are aliphatic diol having 2 to 15 carbon atoms such as ethylene glycol, 1,2-propane diol, 1,3-propane diol, 1,4-butane diol, 2,3-butane diol, 1,6-hexane diol, 1,8-octane diol, neopentyl glycol and 1,10-decane diol; poly(alkyleneoxide)-α,ω-diol such as diethylene glycol, triethylene glycol, polyethylene glycol, poly(tetramethyleneoxide)-α,ω-diol and a random and block copolymer of ethylene oxide and 1,2-propylene oxide. These diols may be used alone or in combination of two or more kinds thereof. Particularly, when 1,4-butanediol or ethylene glycol is used in an amount of not less than 80 molar % per whole diol component, it preferably shows remarkable increasing of the solvent cracking resistance of polycarbonate.

The above diol component and dicarboxylic acid component can be reacted into the polyester precursor by a conventional polycondensation process. It is generally obtained by heating of both starting materials under the presence or absence of the catalyst for polycondensation and distilling a by-product of water, lower alcohol or the like from the system.

According to the present invention, it is essentially important that the number-average polymerization degree of the polyester precursor is in the range of 1 to 30.

When the number-average polymerization degree of the polyester precursor is within the above range, the resulting copolymer shows a relatively long block length of the unit. The incorporation of the copolymer having such relatively long block length into polycarbonate can improve the defects of polycarbonate without harming of the original properties thereof. When the number-average polymerization degree of the polyester precursor is less than 1, that is, when the dicarboxylic acid component and the diol component are not substantially reacted, the copolymerization by adding of polycarbonate into the system gives copolymer having relatively short block length. The incorporation of the copolymer having such relatively short block length of the unit (i.e. high random property) into polycarbonate does not perfect the object of the present invention that the solvent cracking resistance of polycarbonate is improved without harming of the excellent original characteristics thereof. On the other hand, the number-average polymerization degree of the polyester precursor is over 30, the homogeneous dispersion of the polyester precursor and polycarbonate becomes difficult, there can be hardly obtained the copolymer having relatively long block length. According to the present invention, it is preferable that the polyester precursor has a number-average polymerization degree of 1 to 20.

It is preferred that the polycarbonate used in the copolymerization of the present invention has a viscosity-average molecular weight (sometime expressed as "molecular weight") of not less than 5,000, more preferably in the range of 8,000 to 100,000. When the molecular weight is within the above range, there may be readily obtained the copolymer having relatively long block length. The method wherein the copolymer is obtained by directly adding of phosgene and a bisphenol type compound to polyester or an precursor thereof, or the copolymer is obtained by copolymerization of oligocarbonate having a molecular weight of less than 5,000 and polyester or a precursor thereof can give a relatively short block length of polycarbonate unit in the copolymer. Then, the incorporation of the copolymer having such relatively short block length into polycarbonate does not perfect the object of the present invention that the solvent cracking resistance of polycarbonate is improved without harming of the excellent original characteristics thereof.

In the present invention, the block length can be expressed as a melting point depression of the resultant copolymer. For example, when the ester component constituting the copolymer has a crystalline structure, it is preferable that the melting point per polyester unit in the copolymer satisfies the following equation:

$$A - B \leq 150 \text{ times } y/x$$

wherein A is the melting point (K°) of the polyester without the polycarbonate segment; B is the melting point (K°) based on the polyester unit in the copolymer; x is the molar number of the polyester in the copolymer; and y is the molar number of the polycarbonate in the copolymer.

The ratio of the polyester precursor to polycarbonate is preferably in a range of 5 to 100 parts by weight of polycarbonate per 100 parts by weight of the polyester precursor. When the copolymerization ratio of polycarbonate is too little, it is difficult to maintain the excellent properties of polycarbonate. On the other hand, when the copolymerization ratio of polycarbonate is excessive, the defects of the polycarbonate can be insufficiently improved. The most preferred ratio of copolymerization is in the range of 5 to 30 parts by weight of polycarbonate per 100 parts of the polyester precursor.

The copolymerization of the present invention is effected by mixing the said specific polyester precursor with polycarbonate in the desired amount and then subjecting to a conventional polymerization condition of polyester. It is most convenient that after producing of the said polyester precursor, polycarbonate is added into the system to continue the polymerization and give the desired copolymer.

When the polyester-polycarbonate copolymer thus obtained in the present invention is incorporated into bisphenol type aromatic polycarbonate having the same or different structure from that of the polycarbonate used in the above copolymerization, it can provide a remarkable transparency effect. Further, the copolymer is used for various molding articles as a resin which has improved heat resistance and impact resistance.

The polyester type copolymer obtained above is incorporated in an amount of 5 to 200 parts by weight per 100 parts by weight of the above bisphenol type aromatic polycarbonate. When the polyester type copolymer is less than 5 parts by weight, it shows an insufficient improvement of the physical properties of desired polycarbonate. On the other hand, the amount of incorporation is over 200 parts by weight, the resulting composition is inferior in the original properties of the polycarbonate resin (i.e. high impact resistance). Preferred ratio of incorporation is 10 to 50 parts by weight of the polyester type copolymer to 100 parts by weight of polycarbonate. Further, the effect, particularly transparency, of the present invention is improved remarkably by incorporation of the above copolymer into bisphenol type aromatic polycarbonate having the same structure as that of the polycarbonate used in the copolymerization. The molecular weight of bisphenol type aromatic polycarbonate is preferably in an range of 5,000 to 100,000.

The method of mixing of polycarbonate with the polyester type copolymer to obtain the polycarbonate resin composition of the present invention includes various methods which are generally used for addition of a plasticizer or a filler into a thermoplastic resin. For example, there can be used an extruder, Banbury mixer, kneader roll, or the like.

Thus obtained polycarbonate resin composition has following melt index, tensile impact strength, haze and solvent cracking resistance (critical strain):

melt index (280° C., g/10 min) is not less than 8 g/10 min;

tensile impact resistance (kg.cm/cm$^2$) is not less than 580 kg.cm/cm$^2$;

haze (%) is not more than 12%; and solvent cracking resistance (critical strain; %) is not less than 0.25%.

I desired, there may be incorporated various fillers into the polyester type copolymer and the polycarbonate resin composition of the present invention. Suitable examples of the filler are carbon black, titanium oxide, alumina, silica, talc, glass fiber, asbestos, other pigments and dyes and the like.

The molding of the present polycarbonate resin composition can be carried out by a conventional molding method for a thermoplastic resin such as extrusion molding, injection molding, compression molding, calender molding and the like as it is.

EXAMPLE

The following examples are intended to illustrate the present invention in detail. $\eta_{sp}$ used herein was measured in a mixed solvent (phenol/tetrachloroethane 1:1 by weight) at 0.5 g/dl, at 30° C.

Preparations 1, 2, 11, 18 and 19

Dimethyl terephthalate (2.5 kg), ethylene glycol, (1.8 kg) and zinc acetate dihydrate (1 g) were heated at 190° C. with stirring to effect ester exchange reaction. After desired amount of methanol was mostly distilled off, triphenyl phosphate (1.2 g) and antimony oxide (1.1 g) were added. The mixture was heated to 240° C., and stirred under reduced pressure with an aspirator for 15 minutes to obtain a polyethylene terephthalate oligomer having a number-average polymerization degree of 10 (a polyester precursor). The polymerization degree was measured according to the terminal group analysis.

After the system was brought to an ambient pressure, bisphenol A type polycarbonate (produced by Idemitsu Petrochemical Co., Ltd.; Idemitsu Polycarbonate A-3000, viscosity-average molecular weight: 29,000) in a given amount (Preparation 1, 380 g; Preparation 2, 620 g; Preparation 11, without addition; Preparation 18, 80 g; Preparation 19, 3,000 g) was added and the mixture was kneaded, under reduced pressure with the using of an aspirator again. After the pressure reached to 50 torr, the temperature of the system was raised to 280° C. over the period of 10 minutes. After 15 minutes, the pressure was brought to 0.2 torr with a vacuum pump and heating was continued with stirring. After 2 hours, the reaction was terminated and the reaction product was isolated and quenched. The products obtained in Preparations 1, 2, 18 and 19 were transparent and could not be fractionated by dissolution in methylene chloride, which is a good solvent for polycarbonate while non-solvent for polyethylene terephthalate, and by dissolution in a mixed solvent of phenol/tetrahydrofuran (1:1 by weight), which provides a good solvent for polyethylene terephthalate while non-solvent for polycarbonate. Thus, the products obtained in Preparations 1, 2, 18 and 19 were found to be copolymers in which a polyester component and a polycarbonate component are chemically bounded together.

The analysis of the said copolymer with DSC (Differential Scanning Calorimeter) showed a melting point in the range of 252°-256° C. for each copolymer; therefore they were confirmed as copolymers with a blocked polyethylene terephthalate segment. The polyethylene terephthalate homopolymer obtained in Preparation 11 showed a melting point of 260° C.

Preparation 3

Polycondensation was carried out in the same manner as described in Preparation 1, except that mixed diol of ethylene glycol (1.26 kg) and 1,4-cyclohexadimethanol (1.25 kg) (0.7/0.3 by mole) was used instead of ethylene glycol, 1.8 kg. The obtained product could not be fractionated by the solvent according to the similar solvent examination as described in Preparation 1; therefore, the product was confirmed to be copolymerized.

Preparation 12

Polycarbonate was incorporated at the same time as the addition of dimethyl terephthalate and ethylene glycol, and the procedure of Preparation 1 was repeated. The obtained product was confirmed to be copolymerized by the same solvent examination as described in Preparation 1; however, the melting point of the polyethylene terephthalate component according to the analysis with DSC was not clearly defined.

Preparation 13

Polyester having a number-average polymerization degree of 100 was obtained according to Preparation 1, and then polymerization reaction was carried out in the same manner as described in Preparation 1. The obtained product was opaque when melted, and most of the product could not be fractionated by the solvent examination; therefore it is confirmed not to be chemically copolymerized. Also, the said product was partly insoluble in the solvent for viscosity measurement; therefore the viscosity could not be defined.

Preparations 14, 15 and 16

Polymer was obtained in the same manner as described in Preparation 1, except for given amount of polycarbonate having a viscosity-average molecular weight of 2,600. The melting point corresponding to the polyethylene terephthalate segment of the resulting polymer was 250° C. for that prepared by adding of 5 parts by weight of polycarbonate per 100 parts by weight of the polyester precursor (Preparation 14). While a clear melting point was not found for that prepared by adding of 10 parts by weight (Preparation 14) and 15 parts by weight (Preparation 15) of polycarbonate, per 100 parts by weight of the polyester precursor.

Preparation 17

A polyester copolymer was obtained in the same manner as described in Preparation 3, except that bisphenol type polycarbonate was not added.

Preparation 4

Dimethyl terephthalate (2.5 kg), 1,4-butane diol, (2.6 kg) and tetrabutyl titanate (1 g) were heated at 190° C. with stirring to effect ester exchange reaction. After the desired amount of methanol was mostly distilled off, the mixture was heated to 240° C., and stirred under reduced pressure with an aspirator for 15 minutes to obtain a polyethylene terephthalate oligomer having a number-average polymerization degree of 10 (a polyester precursor). A defined amount of polycarbonate was added and polycondensation reaction was carried out in the same manner as described in Preparation 1. The obtained product could not be fractionated by the solvent according to the same solvent examination as described in Preparation 1, therefore, it was confirmed to be copolymerized.

EXAMPLE

Bisphenol A type polycarbonate (100 parts by weight) (produced by Idemitsu Petrochemical Co., Ltd.; Idemitsu Polycarbonate A-3000; Viscosity-average Molecular Weight, 29, 000) and each of the products obtained in the above described Preparations 1–17 in an amount shown in the following table 1, were dried at 120° C. for 12 hours, and chip-blended, and then supplied to an extruder (a 40 mm-extruder produced by Osaka Seizai Kosaku KK, 8VSE-40-28 type), and kneaded under the following condition to be pelletized;
Cylinder Temperature: 270°-275°-275°-280° C. from the hopper side
Adapter Temperature: 270° C.
Die Temperature: 270° C.

The each obtained pellet was dried at 120° C. for 12 hours, then subjected to injection molding by using NIKKO ANKELBERG V-15-75 type injection molder to give test samples (Composition Nos. 1-16)(molding temperature: 120° C.).

The melt index of the pellet (at 280° C., g/10 min.) was measured as an index for moldability and fluidity of the composition; tensile impact strength as an index for impact resistance (according to ASTMD-1822); and haze of the molded leafs with 3 mm thick as an index for transparency. As index of solvent cracking resistance, critical strain was measured according to the ¼ oval method using toluene/isooctane (40/60 by volume) as a solvent (cf. Nakatsuji, Shikizai, 39, 455 (1966)).

The results are shown in Table 1.

weight of less than 5,000, retained transparency, but has no improvement in solvent cracking resistance.

Advantage of the Invention

The present invention provides the composition with improved fluidity and solvent cracking resistance without remarkably decreasing the original impact resistance and transparency of polycarbonate, to eliminate the defects of polycarbonate.

The present invention also provides a useful polyester type copolymer as a modifying agent adapted to improve the fluidity and solvent cracking resistance of polycarbonate without much damage to the original excellent characteristics of polycarbonate. The process for production of the polyester type copolymer of the

TABLE 1

| Composition No. | Polyester Type Copolymer | | | | Amount (parts by weight per 100 parts of Polycarbonate | Melt Index (280° C.) g/10 min | Tensile Impact Strength kg cm/cm² | Haze % | Solvent Resistance (Critical Strain) (%) |
|---|---|---|---|---|---|---|---|---|---|
| | Prep. No. | $\eta_{sp}$ dl/g | Glycol Composition (mol %) | (a) | PC Composition (parts by weight) (b) | | | | |
| 1 (Ref.) | — | — | — | — | — | 0 | 4.3 | 900 | 3 | 0.22 |
| 2 | 1 | 0.7 | EG(e) | (100) | 15 | 20 | 8.8 | 780 | 5 | 0.26 |
| 3 | 1 | 0.7 | EG | (100) | 15 | 40 | 10.0 | 630 | 9 | 0.32 |
| 4 | 2 | 0.7 | EG | (100) | 25 | 20 | 8.2 | 800 | 5 | 0.26 |
| 5 | 2 | 0.7 | EG | (100) | 25 | 40 | 9.8 | 680 | 6 | 0.30 |
| 6 (Ref.) | 11 | 0.8 | EG | (100) | 0 | 20(c) | 9.6 | 730 | 25 | 0.26 |
| 7 (Ref.) | 12 | 0.7 | EG | (100) | 15 | 20 | 8.9 | 770 | 6 | 0.23 |
| 8 (Ref.) | 13 | — | EG | (100) | 15 | 20 | 8.5 | 740 | 15 | 0.27 |
| 9 (Ref.) | 14 | 0.4 | EG | (100) | 5 | 20 | >20 | <500 | 17 | 0.23 |
| 10 (Ref.) | 15 | 0.4 | EG | (100) | 10 | 20 | >20 | <500 | 7 | 0.22 |
| 11 (Ref.) | 16 | 0.4 | EG | (100) | 15 | 20 | >20 | <500 | 6 | 0.23 |
| 12 (Ref.) | 18 | 0.7 | EG | (100) | 3 | 20 | 8.8 | 760 | 22 | 0.27 |
| 13 (Ref.) | 19 | — | EG | (100) | 120 | 20 | 5.4 | 840 | 4 | 0.22 |
| 14 | 3 | 0.8 | EG(30) CH(f) | — (70) | 15 | 20 | 12.7 | 790 | 3 | 0.25 |
| 15 | 3 | 0.8 | EG(30) CH(70) | — | 15 | 40 | 16.8 | 690 | 8 | 0.30 |
| 16 (Ref.) | 17 | 0.9 | EG(30) CH(70) | — | 0 | 20(d) | 13.5 | 710 | 20 | 0.25 |
| 17 | 4 | 0.9 | BG(g) | (100) | 15 | 20 | 9.0 | 800 | 5 | 0.27 |
| 18 | 4 | 0.9 | BG | (100) | 15 | 100 | 18.0 | 580 | 9 | 0.42 |

(a)Kind (a)Kind and composition (mol %) of glycol component constituting a polyester precursor.
(b)Parts by weight of polycarbonate per 100 parts by weight of a polyester precursor in a copolymer.
(c)Polyethylene terephthalate homopolymer
(d)Polyethylene-1,4-cyclohexane dimethylene terehthalate
(e)EG: ethylene glycol
(f)CH: cyclohexane dimethanol
(g)BG: 1,4-butanediol As is clear from Table 1, the polycarbonate composition prepared by incorporation of the copolymer of the present invention was found to improve fluidity and solvent cracking resistance of the polycarbonate without remarkably decreasing its original impact resistance and transparency.

On the other hand, the composition Nos. 6 and 16 which employed, as a modifying agent for polycarbonate, polyester copolymerized with no polycarbonate have improved fluidity and solvent cracking resistance, and remarkably decreased transparency.

The composition No. 7, using a copolymer which was obtained by adding of polycarbonate during the polycondensation of dimethyl terephthalate and ethylene glycol retained its original transparency, but showed insufficient improvement in solvent cracking resistance. On the other hand, the composition No. 8, which employs the product obtained by the reaction of polyethylene terephthalate having a number-average polymerization degree of 100 with polycarbonate, has remarkably decreased transparency with haze above 10.

Moreover, similar to the composition No. 7, the composition Nos. 9, 10 and 11 which employs the copolymer obtained from polycarbonate having a molecular present invention itself has an advantage in industry because it is readily carried out by adding of bisphenol type polycarbonate having a molecular weight of not less than 5,000 at the specific stage of the conventional polycondensation reaction of polyester followed by further conventional polycondensation.

What is claimed is:

1. A polycarbonate resin composition which comprises
(i) aromatic polycarbonate having a unit of the structure of the following formula (II):

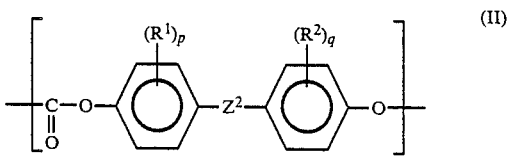

wherein $Z^2$ is a bond or $C_{1-8}$ alkylene, $C_{2-8}$ akylidene, $C_{5-15}$ cycloalkylene, $C_{1-15}$ cycloalkylidene, $SO_2$, SO, O CO or

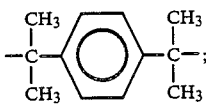

R¹ and R² are, respectively, chlorine or bromine atom, or $C_{1-8}$ saturated alkyl group; and p and q are respectively integers of 0–4, in admixture with (ii) 5 to 200 parts by weight of a copolyester, per 100 parts by weight of said aromatic polycarbonate, which is produced by adding (a) 5 to 30 parts by weight of aromatic polycarbonate having a unit of the structure of the formula (II):

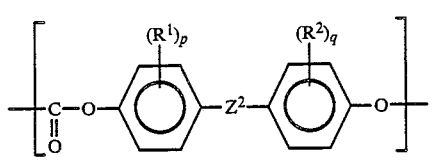

wherein $Z^2$ is a bond or $C_{1-8}$ alkylene, $C_{2-8}$ akylidene, $C_{5-15}$ cycloalkylene, $C_{5-15}$ cycloalkylidene, $SO_2$, SO, O CO or

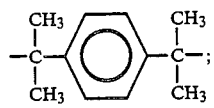

R¹ and R² are, respectively, chlorine or bromine atom, or a $C_{1-8}$ saturated alkyl group; and p and q are respectively integers of 0–4, and having a viscosity-average molecular weight of not less than 5,000, to (b) 100 parts by weight of a polyester precursor having a number-average polymerization degree of 1 to 20 which is obtained from bifunctional carboxylic acid mainly composed of terephthalic acid or a derivative thereof having an ester forming ability and a diol component selected from the group consisting of aliphatic diols, poly(alkyleneoxide)-α,ω-diols and a mixture thereof, and effecting polycondensation.

2. A composition according to claim 1, wherein the copolyester is incorporated into polycarbonate in an amount of 10 to 50 parts by weight, per 100 parts by weight of polycarbonate.

3. A composition according to claim 1, wherein the bifunctional carboxylic acid component is composed of terephthalic acid and one or more kinds of dicarboxylic acids selected from the group consisting of aliphatic and aromatic dicarboxylic acids other than terephthalic acid in an amount of not more than 20 molar % based on the whole dicarboxylic acid.

4. A composition according to claim 1, the polyester precursor having a unit of the following formula (I):

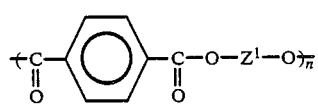

wherein $Z^1$ is one or more kinds of bifunctional residues selected from the group consisting of alkylene and poly(alkylene oxide) residues, and n is 1 to 20.

5. A composition according to claim 4, wherein $Z^1$ is one or more kinds of bifunctional residues selected from the group consisting of residues which are produced by removing of hydroxy groups from member selected from the group consisting of an aliphatic diol having 2 to 15 carbon atoms and an alicyclic diol having 6 to 8 carbon atoms.

6. A composition according to claim 5, wherein $Z^1$ is a bifunctional residue which is produced by removing of hydroxy groups from ethylene glycol.

7. A composition according to claim 6, wherein $Z^1$ is a bifunctional residue produced by using ethylene glycol in an amount of not less than 80 molar % per whole diol component and removing hydroxy groups therefrom.

8. A composition according to claim 5, wherein $Z^1$ is a bifunctional residue which is produced by removing of hydroxy groups from 1,4-butanediol.

9. A composition according to claim 8, wherein $Z^1$ is a bifunctional residue produced by using 1,4-butane-diol in an amount of not less that 80 molar % per whole diol component and removing hydroxy groups therefrom.

10. A composition according to claim 1, the polycarbonate for copolymerization with the polyester precursor having a viscosity-average molecular weight of 8,000 to 100,000.

11. A composition according to claim 1, the polycarbonate having a unit of the structure of the following formula:

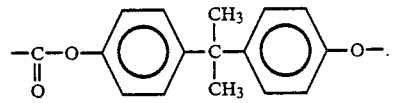

12. A composition according to claim 1 having the following melt index, tensile impact strength, haze and solvent cracking resistance:

melt index (280° C., g/10 min) is not less than 8 g/10 min;

tensile impact resistance (kg. cm/cm²) is not less than 580 kg. cm/cm²;

haze (%) is not more than 12%; and solvent cracking resistance is not less than 0.25%.

13. A composition according to claim 1, wherein the copolyester has a melting point B satisfying the following equation:

$$A - B \leq 150 \text{ times } y/x$$

wherein A is the melting point (K°) of the polyester without the polycarbonate segment; B is the melting point (K°) of the copolyester; x is the molar number of the polyester in the copolyester and y is the molar number of the polycarbonate in the copolyester.

14. A copolyester which is produced by adding (a) 5 to 30 parts by weight of aromatic polycarbonate having a unit of the structure of the following formula (II):

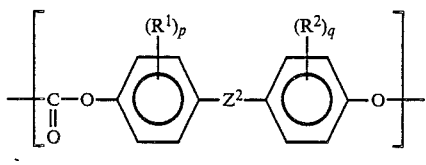

wherein $Z^2$ is a bond or $C_{1-8}$ alkylidene, $C_{2-8}$ alkylidene, $C_{1-15}$ cycloalkylene, $C_{5-15}$ cycloalkylidene, $SO_2$, SO, O CO or

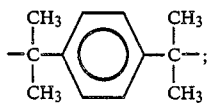

$R^1$ and $R^2$ are, respectively, chlorine or bromine atom, or a $C_{1-8}$ saturated alkyl group; and p and q are respectively integers of 0–4, and having a viscosity-average molecular weight of not less that 5,000, to (b) 100 parts by weight of a polyester precursor having a number-average polymerization degree of 1 to 20 which is obtained from bifunctional carboxylic acid mainly composed of terephthalic acid or a derivative thereof having an ester forming ability and a diol component selected from the group consisting of aliphatic diols, poly(alkyleneoxide)-α,ω-diols and a mixture thereof, and effecting polycondensation.

15. Copolyester according to claim 14, wherein the bifunctional carboxylic acid component is composed of terephthalic acid and one or more kinds of dicarboxylic acids selected from the group consisting of aliphatic and aromatic dicarboxylic acids other than terephthalic acid in an amount of not more than 20 molar % based on the whole dicarboxylic acid.

16. A copolyester according to claim 14, the polyester precursor having a unit of the following formula (I):

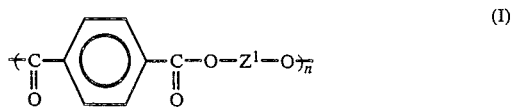

wherein $Z^1$ is one or more kinds of bifunctional residues selected from the group consisting of alkylene and poly(alkylene oxide) residues and n is 1 to 20.

17. A copolyester according to claim 16, wherein $Z^1$ is one or more kinds of bifunctional residues selected from the group consisting of residues which are produced by removing of hydroxy groups from member selected from the group consisting of an aliphatic diol having 2 to 15 carbon atoms and an alicyclic diol having 6 to 8 carbon atoms.

18. A copolyester according to claim 17, wherein $Z^1$ is a bifunctional residue which is produced by removing of hydroxy groups from ethylene glycol.

19. A copolyester according to claim 17, wherein $Z^1$ is a bifunctional residue which is produced by removing of hydroxy groups from 1,4-butanediol.

20. A copolyester according to claim 14, the polycarbonate for copolymerization with the polyester precursor having a viscosity-average molecular weight of 8,000 to 100,000.

21. A copolyester according to claim 14, the polycarbonate having a unit of the structure of the following formula:

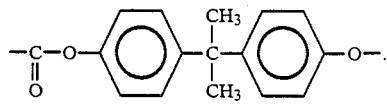

* * * * *